(No Model.)

A. T. HARPER.
LAST BLOCK FASTENER.

No. 566,515.   Patented Aug. 25, 1896.

Witnesses:

Inventor:

UNITED STATES PATENT OFFICE.

ABRAHAM T. HARPER, OF PORTLAND, MAINE.

LAST-BLOCK FASTENER.

SPECIFICATION forming part of Letters Patent No. 566,515, dated August 25, 1896.

Application filed April 11, 1896. Serial No. 587,081. (No model.)

*To all whom it may concern:*

Be it known that I, ABRAHAM T. HARPER, a citizen of the United States of America, residing at Portland, in the county of Cumberland and State of Maine, have invented certain new and useful Improvements in Last-Block Fasteners; and I do hereby declare the following to be a full, clear, and exact description of the invention, such as will enable others skilled in the art to which it appertains to make and use the same.

My invention relates to improvements in last-block fasteners and especially to means whereby the block may be quickly fastened to and removed from the last.

It consists of a spring-actuated plunger set in the last and in certain details of construction to be hereinafter more fully set forth.

Figure 1:
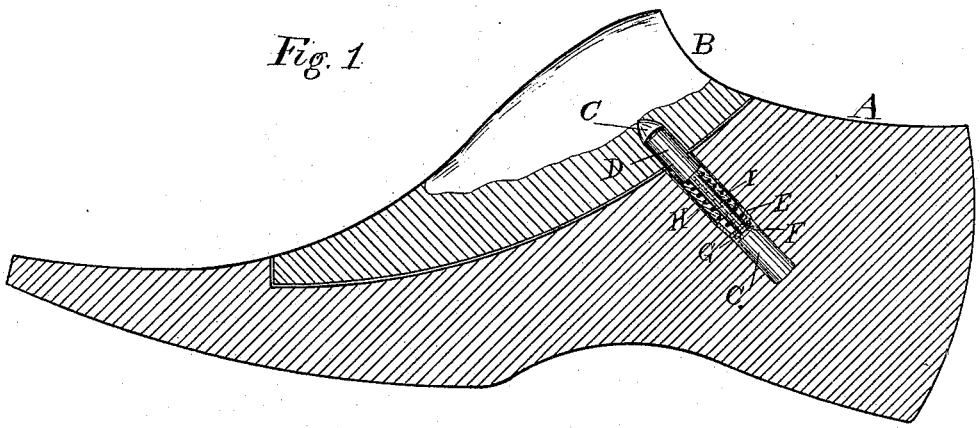
Figure 2:
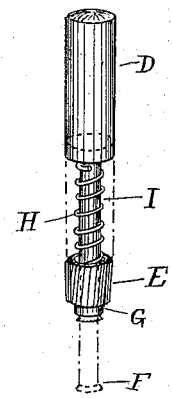

In the drawings herewith accompanying and making a part of this application, Figure 1 is a longitudinal sectional view of a last with my improved fastener in position; and Fig. 2 is a perspective view of my improved fastener, the dotted lines showing the locking-bar compressed as when the fastener is driven into the last.

Like letters refer to like parts.

In said drawings, A represents the last, and B the block. Near the top of the last is a socket C. Adapted to be firmly set in said socket is a spring-actuated locking-bar D, the lower portion of which is smaller in diameter than the upper, as shown at I, and adapted to slide in a sleeve E, having a sufficient bore to allow the spindle or lower portion thereof to move easily through it and also to serve as a rest or seat for the spring when the locking-bar is compressed. The lower end of the spindle is provided with a washer G, and is headed, as at F, to prevent the sleeve from leaving the spindle. Around the spindle, and adapted to fit between the sleeve and the shoulder formed by the increased circumference of the upper half of the plunger, is a coil-spring H. This spring tends to hold the sleeve at the lower end of the spindle until pressure is brought to bear upon it from above, when, as the socket in the last is of sufficient depth, the locking-bar is pushed downward, so as to be perfectly flush with the top of the last. The outer edges of the sleeve are corrugated or milled, so that when it is driven into the socket it will be held firmly in position.

In last-fasteners of this class as heretofore constructed the fastener has been surrounded by an inclosing case or ferrule. This has been found a great disadvantage, for in making the socket in the last it has been necessary to bore a hole of sufficiently large diameter both in the last and block to allow the whole fastener to be inserted therein, and the only way in which such fasteners will securely hold the block to the last is by inserting a metallic ferrule or collar in the socket in the block, which causes additional expense and hinders in some degree the successful loosening of the catch by the last-hook. In my device this is entirely done away with. The locking-bar being of the same diameter as that of the sleeve, the socket made for the sleeve is not too large to prevent the plunger when extended through the block from holding it firmly to the last without the use of a ferrule or similar device.

The operation of my device is as follows: After the last has been made, the socket bored, and the block removed the fastener is placed in the socket in the last and then driven down until the sleeve will bind rigidly in the socket. As the shoulder of the locking-bar rests on the edges of the sleeve, they form thereby a firm surface for driving the fastener into the socket, and as the spring is concealed within the sleeve it is not impaired at all in the process of driving the fastener into the last. This will allow the locking-bar to extend above the top of the last when the block is placed in position, and as the hole in the block registers with the hole in the last the locking-bar will, as soon as the two sockets are brought one above the other, through the resiliency of the spring, be forced into the socket in the block and hold it firmly in place. To remove the block, it is only necessary to insert the last-hook in the socket, press down upon the locking-bar, and thereby release the block, the hole in the block being at such an angle that the hook will remove the block by simply an upward pull.

The advantages of my improved fastener are that it can be readily and easily driven into the socket in the last without destroying the resiliency of the spring, and that it dispenses with the use of ferrules either in the last or block.

Having thus described my invention and its use, I claim—

1. The combination with a last and block each provided with a socket of uniform diameter and adapted to register with each other, of a sleeve secured in the socket in the last, a locking-bar having the same diameter as the external diameter of the sleeve and a spindle of reduced diameter to pass through and move vertically in said sleeve and a coil-spring surrounding said spindle and interposed between the sleeve and the shoulder on the locking-bar and tending normally to force the locking-bar outward, substantially as and for the purposes set forth.

2. The combination with a last and block each provided with a socket of uniform diameter and adapted to register with each other, of a sleeve secured in the socket in the last and having the same diameter as the diameter of the locking-bar, a locking-bar having the same diameter as the sockets and a spindle of a less diameter than the interior bore of the sleeve adapted to pass through and move vertically in said sleeve and a coil-spring surrounding said spindle and interposed between the bottom of the sleeve and the shoulder on the locking-bar and tending normally to force the locking-bar outward, substantially as and for the purposes set forth.

3. The combination with a last and block, each provided with a socket of uniform diameter adapted to register with each other, of a sleeve secured in the socket of the last, a locking-bar having the same diameter as the external diameter of said sleeve, and a spindle of less diameter than the interior bore of the sleeve adapted to pass through and move vertically therein, and a coil-spring surrounding said spindle and interposed between the bottom of the sleeve and the shoulder on the locking-bar, substantially as and for the purposes set forth.

In testimony whereof I affix my signature, in presence of two witnesses, this 1st day of April, 1896.

ABRAHAM T. HARPER.

Witnesses:
ELGIN C. VERRILL.
NATHAN CLIFFORD.